United States Patent [19]
Morton

[11] Patent Number: 6,163,406
[45] Date of Patent: Dec. 19, 2000

[54] LENTICULAR IMAGE BEARING MEMBER WITH VARIABLE LINE SPACING TO IMPROVE IMAGE QUALITY

[75] Inventor: Roger R. A. Morton, Penfield, N.Y.

[73] Assignee: Eastman Kodak Company, Rochester, N.Y.

[21] Appl. No.: 09/195,946

[22] Filed: Nov. 19, 1998

[51] Int. Cl.$^7$ .................................................. G02B 27/10
[52] U.S. Cl. ........................................................ 359/619
[58] Field of Search ................................... 359/619, 626, 359/625

[56] References Cited

U.S. PATENT DOCUMENTS 5,276,478   1/1994   Morton ........................................ 355/22

FOREIGN PATENT DOCUMENTS

0570806A2   11/1993   European Pat. Off. .

*Primary Examiner*—Ricky Mack
*Attorney, Agent, or Firm*—William F. Noval

[57] ABSTRACT

An image bearing member is provided in which a plurality of groups of image scan lines are located on the image bearing member that have a variable scan line spacing. Each group of image scan lines includes an on-axis image scan line and a plurality of successive image scan lines spaced from the on-axis image scan line, wherein the scan line spacing increases between each successive image scan lines. The spot size of the image scan line is also preferably varied such that the spot size increase for each successive scan line. Further, an exposure intensity of the image scan lines preferably varies such that the exposure intensity increases for each successive image scan line. Alternatively, both the size and an exposure intensity of the image scan lines can be varied. A lenticular member including a plurality of lenticular lenses corresponding to the plurality of groups of image scan lines is utilized to image the scan lines.

14 Claims, 4 Drawing Sheets

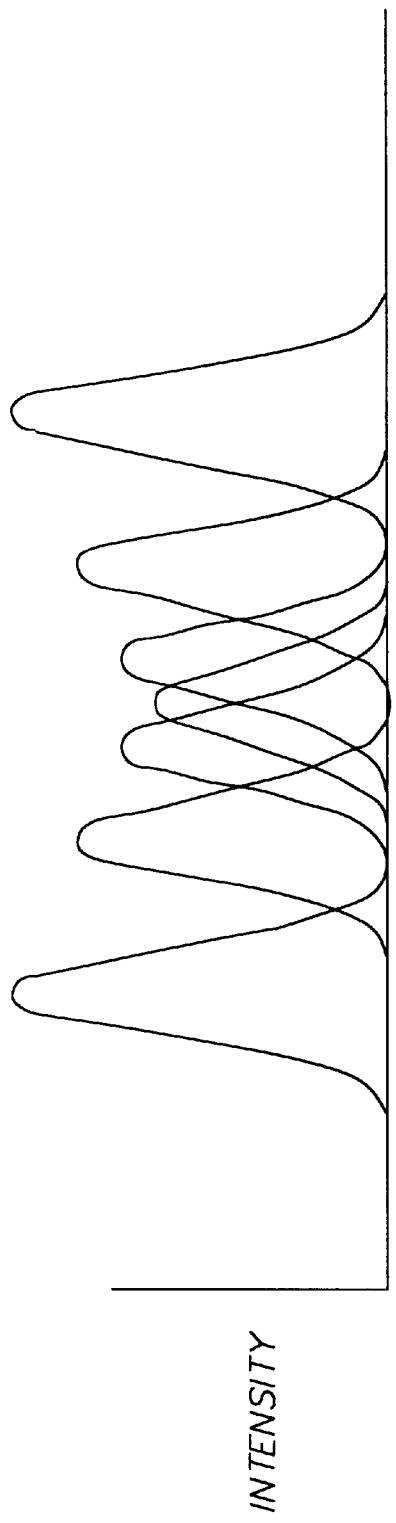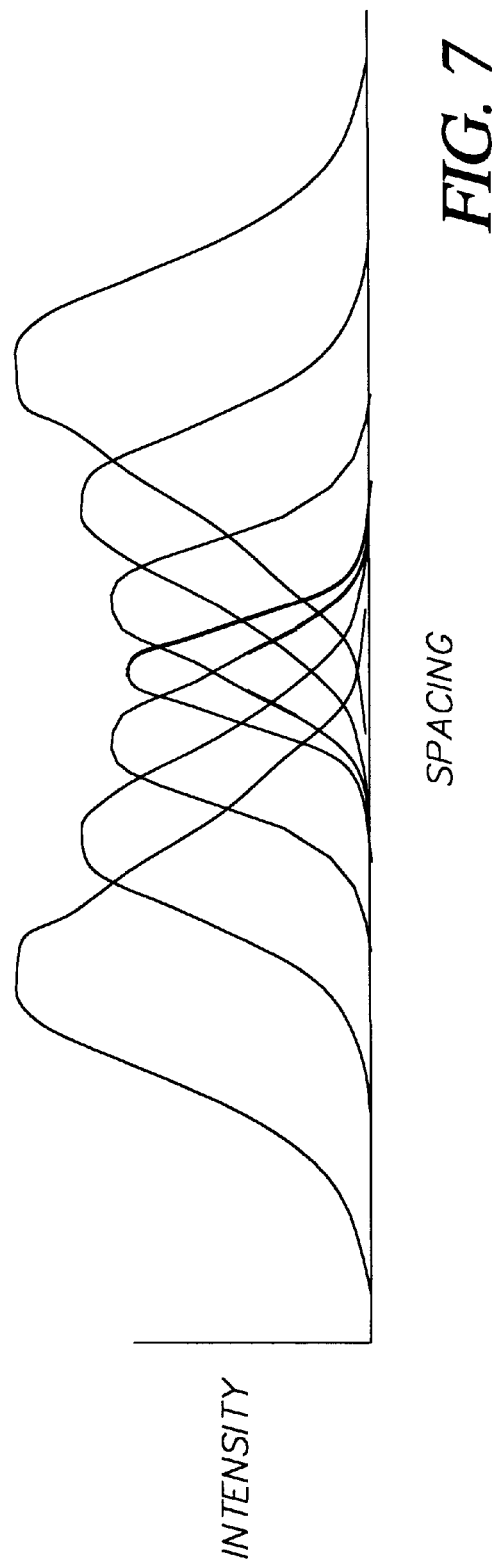

LENTICULAR IMAGE BEARING MEMBER WITH VARIABLE LINE SPACING TO IMPROVE IMAGE QUALITY

FIELD OF THE INVENTION

The invention relates in general to lenticular imaging. More specifically, the invention relates to a lenticular image bearing member and a method of manufacturing a lenticular image bearing member having a variable line spacing to improve image quality.

BACKGROUND OF THE INVENTION

Conventional lenticular imaging techniques have utilized an image receiving member having a plurality of groups of image scan lines corresponding to different views. A constant scan line spacing is used between the image scan lines within a group, thereby resulting in at least one image scan line that is on-axis with a lens utilized to image the scan lines and a number of scan lines that are off-axis with the lens. While the quality of the images when viewed on axis to the lens can be very good, the image quality degrades substantially for off-axis scan lines due to the inherent imitations of the lens. Accordingly, it would be desirable to provide lenticular image in which image quality is maintained when viewing all scan lines.

SUMMARY OF THE INVENTION

The invention provides a lenticular image bearing member and a method of manufacturing a lenticular image in which image viewing quality is maintained when viewing all images. More specifically, an image bearing member is provided in which a plurality of groups of image scan lines are located on the image bearing member that have a variable scan line spacing. Each group of image scan lines includes an on-axis image scan line and a plurality of successive image scan lines spaced from the on-axis image scan line, wherein the scan line spacing increases between each successive image scan lines. The spot size of the image scan line is also preferably varied such that the spot size increase for each successive scan line. Further, an exposure intensity of the image scan lines preferably varies such that the exposure intensity increases for each successive image scan line. Alternatively, both the size and an exposure intensity of the image scan lines can be varied. A lenticular member including a plurality of lenticular lenses corresponding to the plurality of groups of image scan lines is utilized to image the scan lines.

Other objects and advantages of the invention will become apparent from the following detailed description of the preferred embodiments of the invention and the accompanying drawings.

BRIEF DESCRIPTION OF THE DRAWINGS

The invention will be described with reference to the following detailed description of the preferred embodiments and the accompanying drawings, wherein:

FIG. 6 is a graph illustrating the recording of scan lines with varied spacing and varied amplitude or intensity; and FIG. 7 is a graph illustrating the recording of scan line, with varied spacing, varied intensity and varied spot size.

DETAILED DESCRIPTION OF THE PREFERRED EMBODIMENTS

Figure 1:
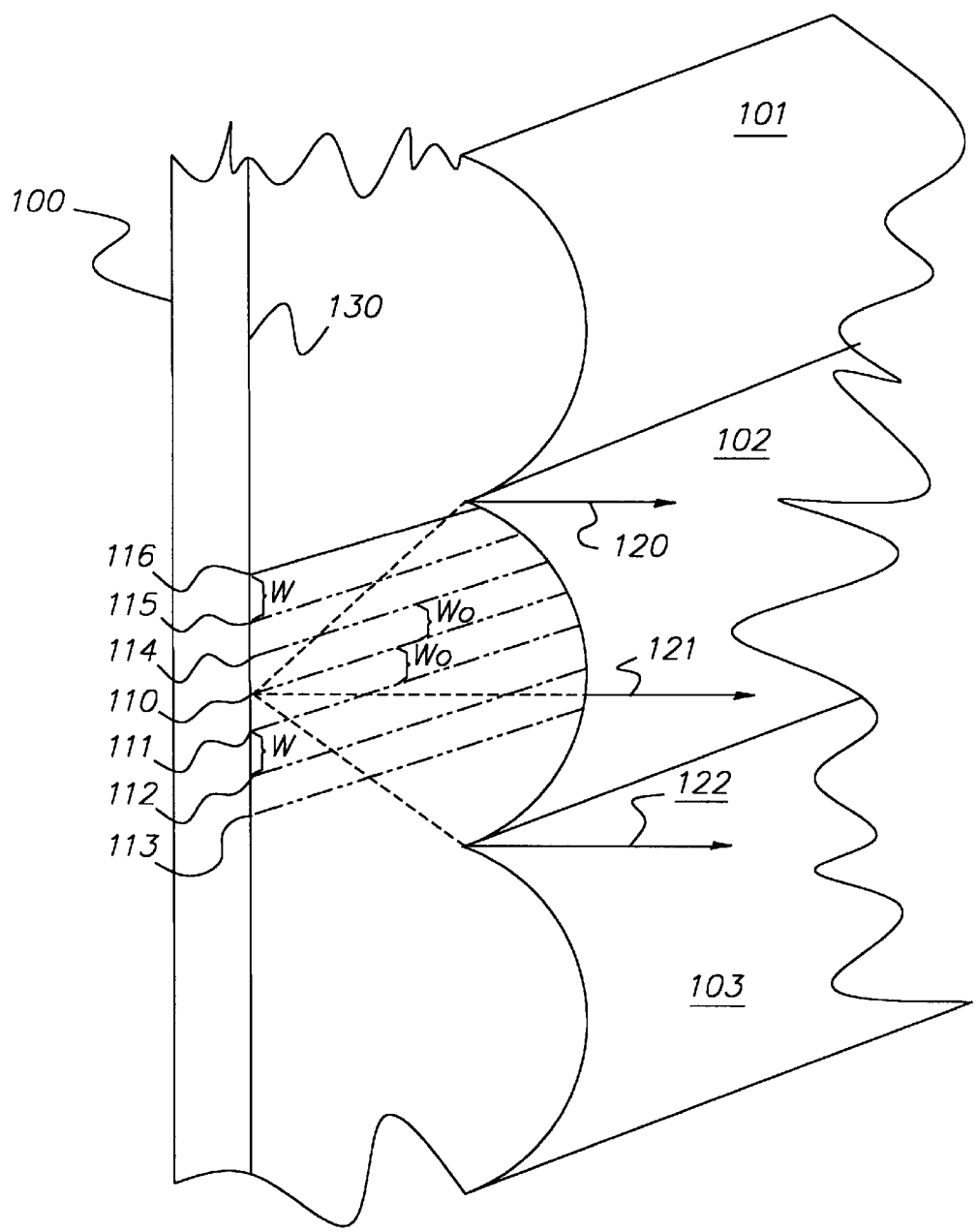
FIG. 1 is a perspective side view of a image bearing in accordance with the invention.

FIG. 1 illustrates a group of image scan lines 110–116 corresponding to a plurality of desired views formed on an image bearing member 100. The scan lines are imaged back to the viewer or observer through an array of lenticular lenses or lenticules 101–103, with each lenticule corresponding to a group of image scan lines. Scan line 110, for example, is imaged back to an observer via rays 120, 121 and 122 utilizing lenticule 102. Scan lines that are on-axis with a lenticules, for example scan line 110 and lenticule 102, can be imaged with high resolution. Scan lines (for example scan lines 113, 116) which are off-axis with respect to a lenticule, however, are poorly imaged because of the inherent limitation of the optical performance of the lenticules.

The invention provides distinct imaging of the scan lines in the face of off-axis degradation of the lenticules by changing the spacing between scan lines, such that the scan lines that are closer to being on axis, where the lenticule is imaging with greater resolution, are closer together, and the scan lines that are farther from being on axis are farther apart as the image resolution of the lenticules drops. Thus, the spacing w between scan line 115 and scan line 116, which are off-axis with respect to lenticule 102, is greater than the spacing Wo between the scan line 110, which is on axis, and the slightly off axis scan line 111. Further, the variation in spacing is preferable symmetrical about the on axis scan line 110 extending to the two exterior scan lines of the group, namely, scan lines 113 and 116.

Figure 2:
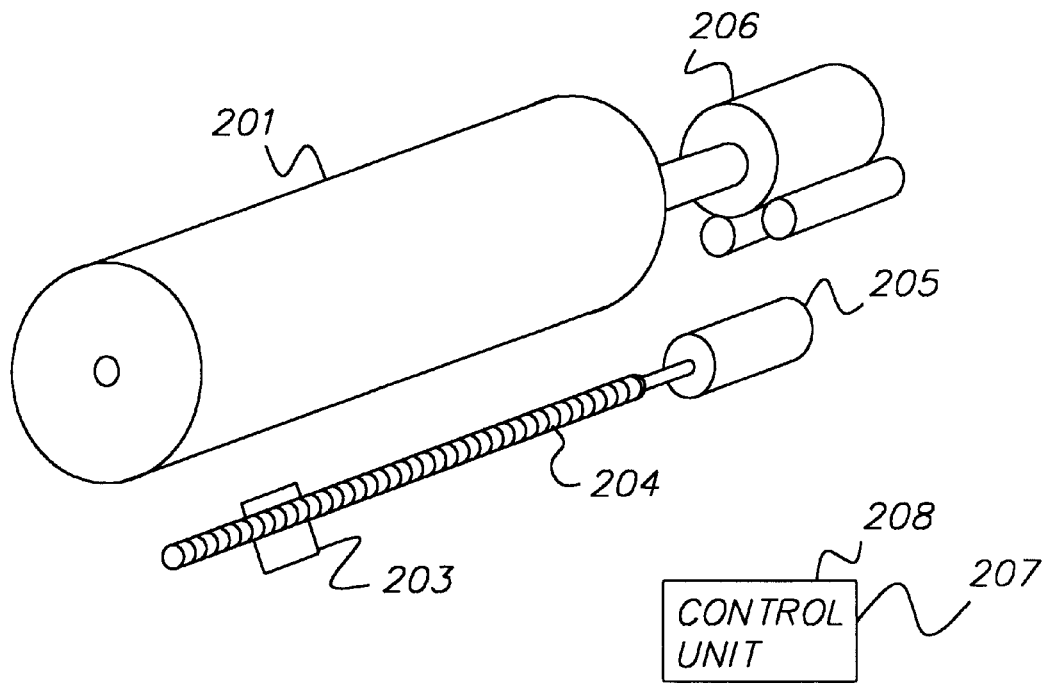
FIG. 2 illustrates an apparatus for recording image information on the image bearing member illustrated in FIG. 1.

FIG. 2 illustrates a mechanism for generating a lenticular image with the varied spacing between scan lines illustrated in FIG. 1. An image plane 130 of the image bearing member 100 is written to using a drum scanner by positioning a film or other image forming media comprising the image bearing member 100 on drum 201 which is driving around axis 202 by a motor 206. An image exposing head 203 is provided on a driven screw thread 204 that is driving by a stepping motor 205, such that rotation of the screw thread 204 causes the image exposing head 203 to scan the width of the drum 201. Image data entering on data line 207 is utilized by a control unit 208 to control the intensity and spot size of an image writing source located in the image exposing head 203. The control unit 208 also controls the operation of the motor 205 to change the advancement of the image exposing head 203 during exposure operations, such that the spacing between individual scan lines is varied as illustrated in FIG. 1.

Figure 3:
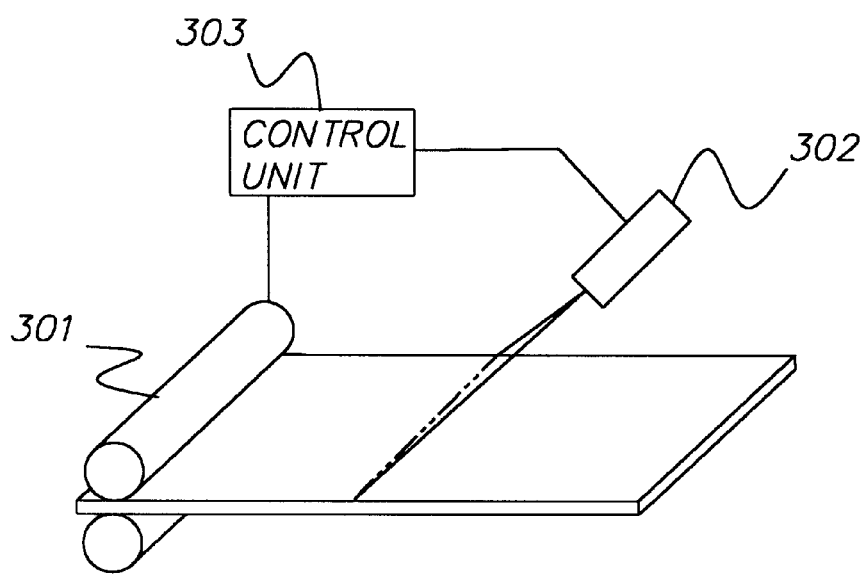
FIG. 3 illustrates a second apparatus for recording image information on the image bearing member illustrated in FIG. 1.

Alternatively, as shown in FIG. 3, a scanning beam may be utilized to record the views on the image plane 130. In such a case, the image bearing member 100 is driven by a transport mechanism 301 in a direction perpendicular to a scanning direction of a scanning recording head 302. A control unit 303 coordinates the operation of the transport mechanism 301 and scanning recording head 302 to move the image bearing member 100 in a manner that results in the scan lines being recorded with varied spacing as shown in FIG. 1. For example, a constant scanning velocity can be maintained while the velocity of the image bearing member 100 is varied by the transport mechanism 301.

Figure 4:
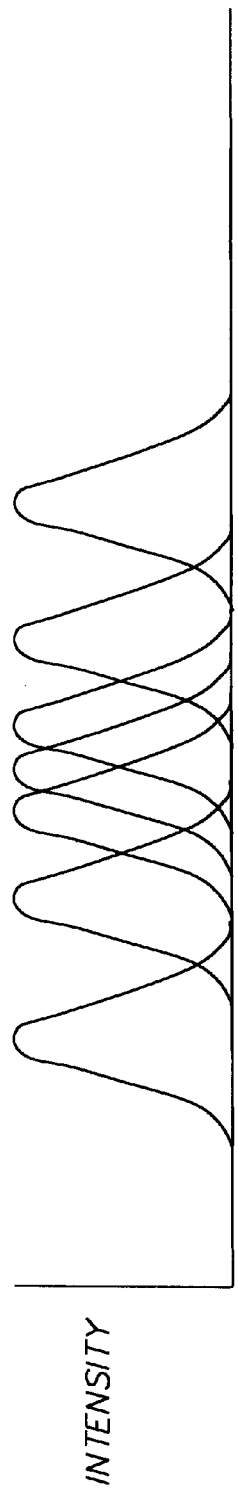
FIG. 4 is a graph illustrating the recording of scan lines with varied spacing.
Figure 5:
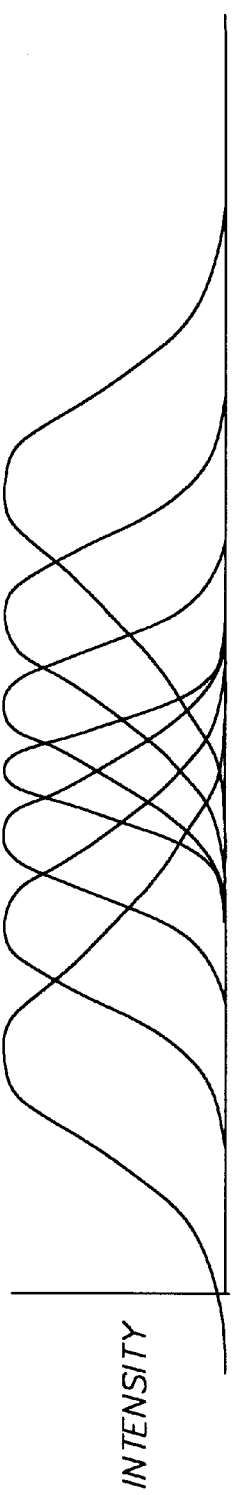
FIG. 5 is a graph illustrating the recording of scan lines with varied spacing and varied spot size.

To compensate for the optical affects of nonuniform scan line spacing, the spot size of the scanning beam can be varied as a function of scan line spacing, the intensity of the scanning beam can be varied as a function of scan line spacing or a combination of both spot size and intensity variations can be utilized. FIG. 4, for example, is a graph illustrating the variation in spacing between views when constant spot size and intensity is used to record the views. FIG. 5 is a graph illustrating variation in spacing and spot size between views. FIG. 7 illustrates varying spacing, spot size and intensity between views.

The invention has been described with reference to certain preferred embodiments thereof. Modifications and variations are possible within the scope of the appended claims.

Parts List

100 Image Bearing Member
101–103 Lenticules
110–116 Scan
120–122 Rays
130 Image Plane
201 Drum
202 Axis
203 Image Exposing Head
204 Screw Thread
205 Stepping Motor
206 Motor
207 Data Line
208 Control Unit
301 Transport Mechanism
302 Scanning Recording Head
303 Control Unit

What is claimed is:

1. An apparatus comprising:

an image bearing member;

a plurality of groups of scan lines located on the image bearing member, wherein the scan lines within a group have a variable scan line spacing;

wherein one of scan line spot size or scan line intensity varies with each successive scan line.

2. An apparatus as claimed in claim 1, wherein each group of scan lines includes an on-axis scan line and a plurality of successive scan lines symmetrically spaced from the on-axis scan line, wherein the scan line spacing increases between each successive scan line.

3. An apparatus as claimed in claim 1, wherein the scan line spot size increases for each successive scan line.

4. An apparatus as claimed in claim 1, wherein the exposure intensity increases for each successive scan line.

5. An apparatus as claimed in claim 1, wherein a scan line spot size and an exposure intensity varies with each successive scan line.

6. The apparatus of claim 1 including a lenticular member comprising a plurality of lenticular lenses corresponding to the plurality of groups of scan lines.

7. An apparatus as claimed in claim 6, wherein each group of scan lines includes an on-axis scan line and a plurality of successive scan lines symmetrically spaced from the on-axis scan line, wherein the scan line spacing increases between each successive scan line.

8. An apparatus as claimed in claim 7, wherein the scan line spot size increases for each successive scan line.

9. An apparatus as claimed in claim 7, wherein the exposure intensity increases for each successive scan line.

10. An apparatus as claimed in claim 6, wherein one of the scan lines within each of the plurality of groups scan lines comprises an on-axis scan line.

11. A method comprising the steps of:

locating an image receiving member with respect to an image writing device; and writing a plurality of groups of scan lines on an image receiving member with the image writing device, wherein scan line spacing between the scan lines within a group varies and wherein one of scan line spot size or scan line intensity varies with each successive scan line.

12. A method as claimed in claim 11, wherein the scan line spot size increases between adjacent scan lines.

13. A method as claimed in claim 11, wherein the writing intensity increases between adjacent scan lines.

14. A method as claimed in claim 11, further comprising the step of varying spot size and writing intensity of the writing device between adjacent scan lines.

\* \* \* \* \*